Patented Dec. 7, 1926.

1,609,539

UNITED STATES PATENT OFFICE.

RICARDO ESPINO, OF SAN FRANCISCO, CALIFORNIA.

MOLDING COMPOSITION.

No Drawing.     Application filed April 14, 1920.   Serial No. 373,960.

This invention relates to compositions of matter, to be used, for example, for molding articles of vertu and other things.

My composition includes plaster, preferably plaster of Paris, flour, glue, and paper, with or without a coloring material.

In carrying out my invention, I soak the paper in water, rubbing it with the hands occasionally, until it is reduced to a pulp. and I then squeeze it approximately in dry state under moderate pressure, such as can be given by the hands. I then dissolve the glue, making it of the thickness ordinarily used by carpenters, and when dissolved, mix it with the paper pulp. The plaster and the flour I mix together dry, and, if a coloring is desired I mix it, dry, with the plaster and flour. These dry ingredients I then mix thoroughly with the paper pulp and glue, and add water to bring the mass to a proper consistency for modeling.

The proportions which I have found in practice to be most satisfactory are the following, viz: plaster of Paris 16 oz.; white flour, 6 oz.; glue, 2½ oz.; paper pulp, 4 oz., and water, add coloring matter according to the depth of tint desired.

Believing I have produced a new and useful composition of matter and having fully described the same—

What I claim and desire to secure by Letters Patent of the United States, is the following, to wit:—

The within described molding composition, composed of paper pulp, 4 oz.; glue, 2½ oz.; white flour, 6 oz.; plaster of Paris, 16 oz.; and water.

In testimony that I claim the foregoing I have hereto set my hand this 25th day of March, 1920.

RICARDO ESPINO.